US012596321B2

(12) United States Patent
Nedelin et al.

(10) Patent No.: US 12,596,321 B2
(45) Date of Patent: Apr. 7, 2026

(54) IDENTIFICATION OF GAS CONVEYANCE MALFUNCTIONS

(71) Applicant: Hewlett-Packard Development Company, L.P., Spring, TX (US)

(72) Inventors: Peter Nedelin, Ness Ziona (IL); Dror Kella, Ness Ziona (IL); Assaf Pines, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/705,246

(22) PCT Filed: Oct. 28, 2021

(86) PCT No.: PCT/US2021/057075
§ 371 (c)(1),
(2) Date: Apr. 26, 2024

(87) PCT Pub. No.: WO2023/075779
PCT Pub. Date: May 4, 2023

(65) Prior Publication Data

US 2024/0411258 A1 Dec. 12, 2024

(51) Int. Cl.
*G03G 15/00* (2006.01)
*G03G 15/11* (2006.01)
(Continued)

(52) U.S. Cl.
CPC ............. *G03G 15/55* (2013.01); *G03G 15/11* (2013.01); *G03G 15/161* (2013.01); *G03G 15/5004* (2013.01); *G03G 21/206* (2013.01)

(58) Field of Classification Search
CPC ...... G03G 15/10; G03G 15/11; G03G 15/161; G03G 15/5004; G03G 15/55; G03G 21/206
See application file for complete search history.

(56) References Cited

U.S. PATENT DOCUMENTS 4,343,096 A 8/1982 Bergland
5,325,158 A 6/1994 Guelfo et al.
(Continued)

FOREIGN PATENT DOCUMENTS

JP 08-166722 A 6/1996
JP 09-057001 A 3/1997
(Continued)

OTHER PUBLICATIONS

Machine Translation of JP 2015-161746. (Year: 2015).*
Machine Translation of JP H08-166722 (Year: 1996).*

*Primary Examiner* — Carla J Therrien
(74) *Attorney, Agent, or Firm* — Jordan IP Law, LLC

(57) ABSTRACT

In an example of the disclosure, a system for identification of gas conveyance malfunctions includes a channel situated to convey a subject gas, a condenser in fluid connection with the channel, and a heat blower positioned in fluid connection with the channel. The heat blower is to heat the subject gas, and to cause the subject gas to move through the channel towards the condenser. The system includes a temperature sensor situated to take a temperature reading of the subject gas within or adjacent the channel. The system includes a controller, operatively connected to the temperature sensor. The controller is to identify a malfunction event for the heat blower, the condenser, or the channel based upon a comparison of the temperature reading to a threshold temperature.

15 Claims, 7 Drawing Sheets

(51) Int. Cl.
*G03G 15/16* (2006.01)
*G03G 21/20* (2006.01)

(56) References Cited

U.S. PATENT DOCUMENTS

| | | | |
|---|---|---|---|
| 6,293,196 | B1 | 9/2001 | Demoore et al. |
| 7,850,274 | B1 | 12/2010 | Chang et al. |
| 8,955,948 | B2 | 2/2015 | Rolland |
| 2006/0127141 | A1 | 6/2006 | Seorl et al. |
| 2012/0183314 | A1 | 7/2012 | Nishino et al. |
| 2013/0216242 | A1 | 8/2013 | Iijima |
| 2013/0216254 | A1 | 8/2013 | Schlumm et al. |
| 2018/0370263 | A1 | 12/2018 | Mauck et al. |
| 2021/0270482 | A1 | 9/2021 | Brahme et al. |

FOREIGN PATENT DOCUMENTS

| | | | | |
|---|---|---|---|---|
| JP | 2015161746 | A | * | 9/2015 |
| JP | 2021-105632 | A | | 7/2021 |

* cited by examiner

IDENTIFICATION OF GAS CONVEYANCE MALFUNCTIONS

BACKGROUND

A printer may apply print agents to a paper or another substrate. One example of a printer is a Liquid Electro-Photographic ("LEP") printer, which may be used to print using fluid print agents such as an electrostatic printing fluids. Such electrostatic printing fluids may include electrostatically charged or chargeable polymeric particles (for example, resin or toner particles) dispersed or suspended in a carrier fluid.

DRAWINGS

DETAILED DESCRIPTION

Figure 1:
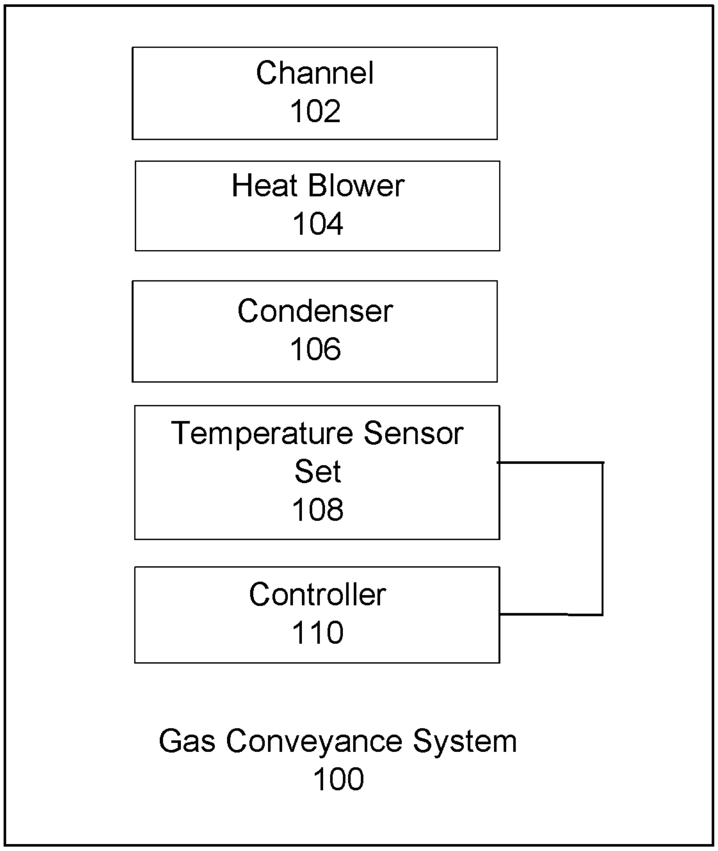
FIG. 1 is a block diagram depicting an example of a system for identification of gas conveyance malfunctions.

In an example of printing, a LEP printer may form an image on a print substrate by placing an electrostatic charge on a photoconductive surface, and then utilizing a laser or other light scanning unit to apply an electrostatic pattern of the desired image on the photoconductive surface to selectively discharge the photoconductive surface. The selective discharging forms a latent electrostatic image on the photoconductive surface. The printer includes a developer assembly to develop the latent image into a visible image by applying a thin layer of polymeric electrostatic ink (which may be generally referred to as "LEP ink" or "electronic ink" in some examples) to the patterned photoconductive surface. Charged particles (sometimes referred to herein as "ink particles" or "colorant particles") in the LEP ink adhere to the electrostatic pattern on the photoconductive surface to form an inked image. In examples, the inked image, including colorant particles and a carrier fluid, is transferred utilizing a combination of heat and pressure from the photoconductive surface to an intermediate transfer member ("ITM") attached to, or incorporated in, an ITM drum or ITM belt. The ITM is heated until carrier fluid evaporates and colorant particles melt. A resulting molten film representative of the image is then applied to the surface of the print substrate via pressure and tackiness. In examples the ITM that is attached to or incorporated within the ITM drum or ITM belt is a consumable or replaceable ITM. For printing with colored LEP inks, the printer may include a separate developer assembly for each of the various colored inks.

A key process in LEP printing is the drying of the ink to form a molten film, and the application of the molten film to the heated ITM. Carrier fluid (e.g., an imaging oil) is evaporated from the LEP ink by virtue of applying heating and air flow adjacent to the ITM. The vapor from this evaporation process contains a high amount of imaging oil. In certain circumstances, if the imaging oil/air mixture is not sufficiently diluted or removed from the printer, ignition and explosion could occur. In some examples insufficient dilution or removal may be the result of an airpath for the imaging oil/air mixture becoming blocked (e.g., blocked by paper, dust, mechanical deformation). In other examples, insufficient dilution or removal may be the result of malfunction of a system component (e.g., a fan, a condenser, or a vacuum element).

One method for avoiding ignition of carrier fluid vapor and potential explosion at a printer is to mix this air with at least 4 times as much fresh air as needed (to reach ¼ Lower Explosion Limit) in an evaporation zone. Another method for avoiding ignition of carrier fluid vapor and potential explosion is to cause the oil-containing air to cross a short, small-volume, evaporation zone, and then cause the oil-containing air to be pulled through a condenser unit for distillation and cooling. A safety control for both methods has been to utilize pressure gauges or flow gauges situated at various points in the carrier fluid evaporation zone to monitor the flow of the oil/air mixture. Such pressure and flow gauges can be complex and delicate, prompting frequent accuracy verification procedures and expensive replacements.

To address these issues, various examples described in detail below provide a system and method for identification of gas conveyance malfunctions utilizing temperature readings. As depicted in FIG. 1, in examples, a system for identification of gas conveyance malfunctions 100 includes a channel 102 situated to convey a subject gas, a condenser 106 in fluid connection with the channel, and a heat blower 104 positioned in fluid connection with the channel.

As used herein, a "channel" refers generally to a passageway. In examples a channel may be partially enclosed by structural elements, e.g., a channel between two structural elements. In other examples, a channel may fully enclosed, e.g., as a channel through a tube or pipe. As used herein a first component being in "fluid connection with" or "fluidly connected to" a second component refers generally to the first and second components being connected in a manner such that a fluid is enabled to flow from the first to the second component, or the reverse.

The heat blower 104 is to heat the subject gas, and to cause the subject gas to move through the channel towards the condenser 104. As used herein, a "heat blower" refers generally to an electromechanical device for providing a heated airflow through an outlet. In examples, the heat blower may be a heated air knife capable of providing through an outlet a heated air flow between 60 m/s and 400 m/s, at temperatures between 110 C and 220 C.

As used herein, a "condenser" refers generally to any component for cooling a hot gas or vapor to a liquid form. In examples, the condenser may include tubing arranged to traverse a core. In examples, the tubing defines a pathway for a cooling fluid (e.g., water), with passage of the subject gas across the tubing causing a cooling of the subject gas. As used herein, a "core" refers generally to an assembly of connected and/or fluidly connected components. In an example, the core of a condenser may include a gas flow inlet, a set of cooling fins, and a gas flow outlet. In examples, the cooling fins, the flow inlet and/or the gas flow outlet may be constructed of a metal, e.g., aluminum, copper, or steel. In other examples, the cooling fins, the gas flow inlet and/or the gas flow outlet may be constructed of a plastic that is capable of withstanding high temperatures, e.g., up to 1700 C.

Continuing at FIG. 1, the system includes a set of temperature sensors 108 situated to take a set of temperature readings of the subject gas within, or adjacent to an end opening, of the channel. In an example, the set of temperature sensors may be a set of thermocouples. In other examples, the set of temperature sensors may include any combination of thermocouples, resistance temperature sensors ("RTDs"), thermistors, semi-conductor-based sensors, or any other type of temperature sensor.

The system includes a controller 110 operatively connected to the temperature sensor set 108. As used here, a "controller" represents the processing and memory resources and the programming, electronic circuitry and components needed to control the operative elements of the system 100. Controller 110 may include distinct control elements for individual system components.

The controller 110 is to identify a malfunction event for the heat blower 104, the condenser 106, and or the channel 102 based upon a comparison of a temperature reading to a predetermined threshold temperature. As used herein, a "malfunction event" or "malfunction" refers generally to a failure to function in a normal or prescribed manner. In a particular example, a malfunction is a failure to function according to a specification.

In examples, the controller is to initiate a recovery action from a set of applicable recovery actions based upon the identified malfunction event. In examples, the controller identifying the malfunction event and/or initiating the recovery event may include the controller accessing predetermined threshold temperatures, historical temperature measurements, historical component malfunction data, and other information in a look up table or other database. In other examples, the controller identifying the malfunction event and/or initiating the recovery event may include the controller accessing one or more of a dynamic database, a neural network, or a machine learning application to access predetermined threshold temperatures, historical temperature measurements, historical component malfunction data, and other information.

Figure 2:
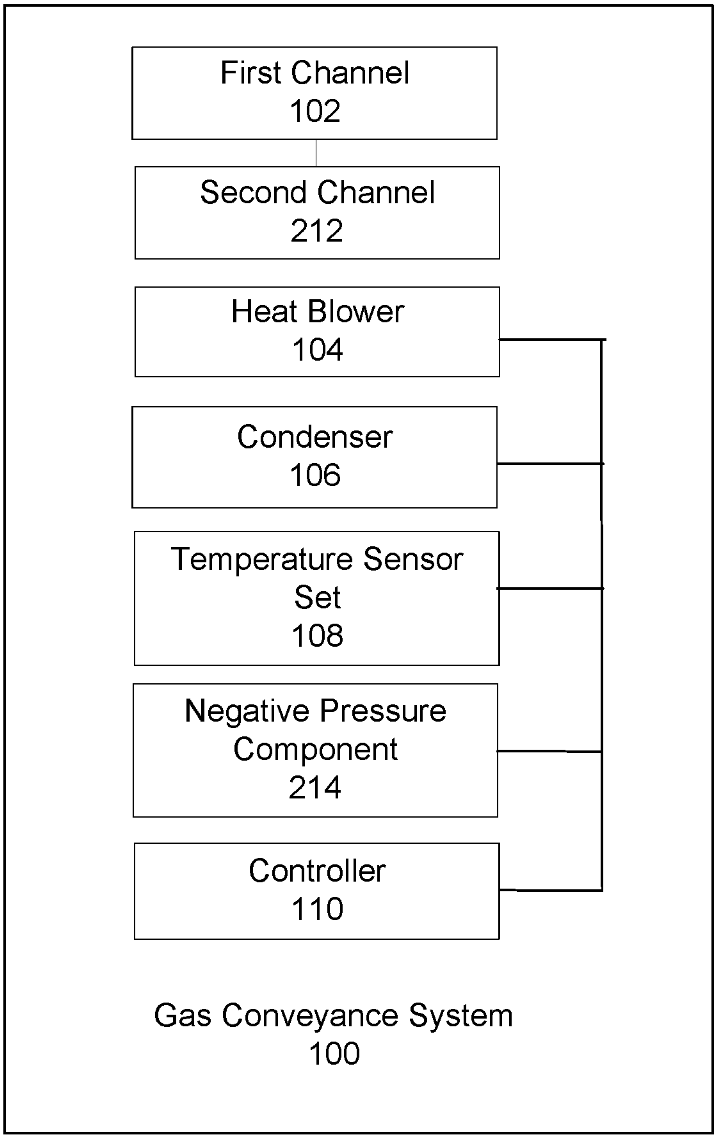
FIG. 2 is a block diagram depicting another example of a system for identification of gas conveyance malfunctions.

Moving to FIG. 2, in certain examples, the system 100 additionally includes a second channel 212 that is fluidly connected to the first channel 102. In these examples the condenser 106 may be situated within the second channel 212, and a negative pressure component 214 may be operatively connected to the second channel 212 to cause the subject gas to move through the second channel 212 and through the condenser 106. In examples the controller 110 is operatively connected to one or more from the set of the heat blower 104, the condenser 106, and the negative pressure component 214. In an example the recovery action to be initiated by the controller 110 for the identified malfunction event is to increase or decrease a heating or a flow of the heat blower 104. In another example the recovery action to be initiated by the controller 110 is to increase or decrease suction created by the negative pressure component 214. In another example the recovery action to be initiated by the controller 110 is to initiate a calibration routine for the system for identification of gas conveyance malfunctions 100 or an apparatus that incorporates the system 100. In another example the recovery action is to cause an automatic shutdown of an apparatus that incorporates the system for identification of gas conveyance malfunctions 100. These and other examples shown in the figures and described below illustrate the claimed subject matter but do not limit the scope of the patent, which is defined by the Claims following this Description. As used herein, the term "negative pressure component" refers to a component for applying suction to cause the subject gas to move through the second channel 212 and through the condenser.

In this manner the disclosed apparatus and method enable the utilization of simple, inexpensive, and robust temperature sensors to identify malfunctions in system for identification of gas conveyance malfunctions. In a particular example, the disclosed apparatus and method enable detection of malfunctions relating to potentially harmful vapor outflows in a carrier fluid evaporation zone of a LEP printer. Users and providers of LEP printers, and other systems (e.g., any system that includes components for heating and moving a potentially volatile subject gas), will appreciate the safety, system reliability and cost benefits afforded by the disclosure. Installations and utilization of LEP printers and other systems that incorporate the disclosed apparatus and/or method should thereby be enhanced.

Figure 3:
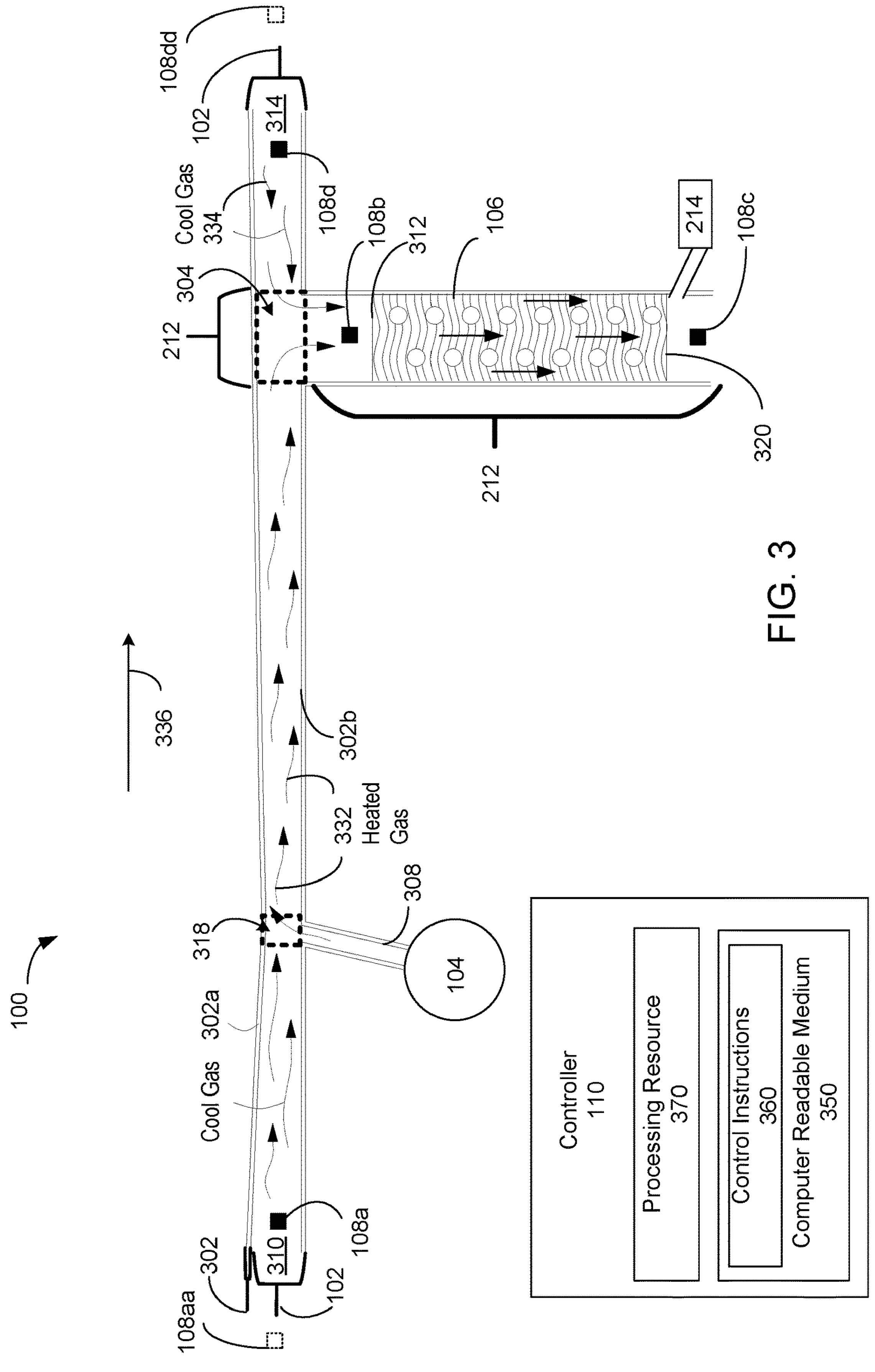
FIG. 3 is a simple schematic diagram that illustrates an example of a system for identification of gas conveyance malfunctions.

FIG. 3 is a block diagram depicting an example of a system for identification of gas conveyance malfunctions. In this example, system 100 includes a first channel 102 situated to convey a subject gas, and a second channel 212 that is fluidly connected to the first channel 102 at a first junction 304. In this example, the first channel is defined in part by a first structural element 302*a* and a second structural element 302*b*. The system includes a condenser 106 that is situated within the second channel 212 and that is thus in fluid connection with the first and second channels 102 212.

In this example, the system 100 includes a heat blower 104 positioned adjacent to and in fluid connection with the first channel 102 to heat the subject gas. The heat blower 104 includes an outlet 308 extended from the heat blower to form a second junction 318 with the first channel 102. The heat blower 104 and its outlet 308 are positioned to cause the subject gas to move through the first channel 102 towards the condenser 106 situated within the second channel 212. In this example the outlet 308 is a slit outlet, such that there is no element of the heat blower 104 or the outlet protruding in the first channel 102. In other examples, the heat blower 104 may include a nozzle, e.g., a nozzle that extends into the channel.

In this example, the system 100 includes a negative pressure component 214 that is positioned so as be operatively connected to the second channel 212 and cause the subject gas to move through the second channel 212 and through the condenser 106.

Continuing at FIG. 3, in this example, the system 100 includes a set of temperature sensors 108*a*-108*d*, each situated to take a temperature reading of the subject gas within, or adjacent to an end opening of, the channel 102. In examples one or more of temperature sensors 108*a*-108*d* may be or include a thermocouple temperature sensor.

In the example shown in FIG. 3, controller 110 includes a processing resource 370 and a computer readable medium 350 with control instructions 360 that represent programming to control the system 100 for identifying gas conveyance malfunctions.

A first temperature sensor 108*a* is positioned adjacent to an end opening 310 of the first channel 102 that is closer to the heat blower 104 than to the first junction 304. The processing resource 370 on the controller 110 executing control instructions 360 is to is to identify a malfunction event for the heat blower 104 or the first channel 102 based upon a comparison of a temperature reading of the subject gas taken by the first temperature sensor 108*a* to a threshold temperature. In an example, controller 110 is to identify the malfunction event based upon a determination the temperature reading exceeds the threshold temperature. In an example, the identified malfunction event may be that the first channel 102 is blocked between the heat blower 104 and the first junction 304. In another example, the identified malfunction event may be that the heat blower 104 is malfunctioning (e.g., the heat blower 104 is bent and thereby pushing heated air 332 in a direction other than an intended direction 336 that is towards the first junction 304 and the second channel 212).

Continuing at FIG. 3, a second temperature sensor 108*b* is positioned in the second channel 212 between the first junction 304 and an inlet 312 to the condenser 106. The processing resource 370 on the controller 110 executing control instructions 360 is to identify a malfunction event for the heat blower 104 or the first channel 102 based upon a comparison of a temperature reading of the subject gas taken by the second temperature sensor 108*b* with a threshold temperature. In an example, controller 110 is to identify the malfunction event based upon a determination the temperature reading is below the threshold temperature. In an example, the identified malfunction event may be a failure of the heat blower 104 to heat the subject gas to a sufficient level. In another example the identified malfunction event may be that the outlet 308 of the heat blower 104 is plugged or blocked. In another example, the malfunction event may be that the first channel 102 is blocked. In another example, the malfunction event may be that the negative pressure component 214 is generating excessive negative pressure such that too much fresh air is introduced into the second channel 212.

A third temperature sensor 108*c* is situated in the second channel 212 downstream of an outlet 320 of the condenser 106. The processing resource 370 on the controller 110 executing control instructions 360 is to identify a malfunction event for the condenser 106 based upon a comparison of a temperature reading of the subject gas taken by the third temperature sensor 108*c* with a threshold temperature. In an example, controller 110 is to identify the malfunction event based upon a determination the temperature reading exceeds the threshold temperature. In an example, the identified malfunction event may be a that a cold-water supply to the condenser, or another chilling property or function of the condenser 106, is insufficient.

A fourth temperature sensor 108*d* is positioned adjacent to an end opening 314 of the first channel 102 that is located on an opposite side of the first junction 304 relative to the outlet 308 of the heat blower 104. The processing resource 370 on the controller 110 executing control instructions 360 is to identify a malfunction event for the negative pressure component 214 or the first channel 102 based upon the comparison with a threshold temperature. In an example, controller 110 is to identify the malfunction event based upon a determination the temperature reading exceeds the threshold temperature. In an example, the identified malfunction event may be that heated gas (e.g., hot air containing oil vapor) is escaping from the first channel 102 through the second end opening 314, rather than moving efficiently through the second channel 212 and the condenser 106. In an example, the identified malfunction event may be that the second channel 212 is at least partially blocked, e.g., blocked between the inlet 312 to the condenser 106 and the outlet 308 of the condenser. In another example, the identified malfunction event may be that the negative pressure component 214 is not providing enough suction.

Continuing at FIG. 3, after the controller 110 identifies a malfunction event for the heat blower 104, the condenser 106, the first channel 102, the negative pressure component 214, and/or the second channel 212, in examples the processing resource 370 on the controller 110 executing control instructions 360 is to initiate a recovery action. In an example, the recovery action for the identified malfunction event may be to increase or decrease a heating or a flow of the heat blower 104. In another example, the recovery action for the identified malfunction event may be to increase or decrease suction created by a negative pressure component 214. In another example, the recovery action may be to increase or decrease a chilling or a flow of the condenser 106. In another example, the recovery action may be to cause a sending of malfunction remedy instructions to a user interface, to prompt user intervention. In yet another example, the recovery action for the identified malfunction event may be to initiate a calibration routine for the system for identification of gas conveyance malfunctions 100, or an apparatus (e.g., an LEP printer or other printing device) that incorporates the system 100. In another example, the recovery action for the identified malfunction event may be to cause an automatic shutdown of an apparatus that incorporates the system for identification of gas conveyance malfunctions 100. An automatic shutdown recovery action is appropriate for identified malfunctions that could lead to injury to a person or destruction of significant damage to property (e.g., a combustion or explosive event).

It should be noted that while in the example discussed above with respect FIG. 3 the first temperature sensor 108*a* is situated within the first channel 102 near the first end opening 310, in other examples the first temperature sensor may be a first temperature sensor 108*aa* situated adjacent to the first end opening 310, yet not inside the first channel 102 that is formed in part by the first and second structural elements 302*a* 302*b*. Likewise, while in the example discussed above with respect FIG. 3 the fourth temperature sensor 108*d* is situated within the first channel 102 near the second end opening 314, in other examples the fourth temperature sensor may be a fourth temperature sensor 108*dd* situated adjacent to the second end opening 314, yet not inside the first channel 102.

Figure 4:
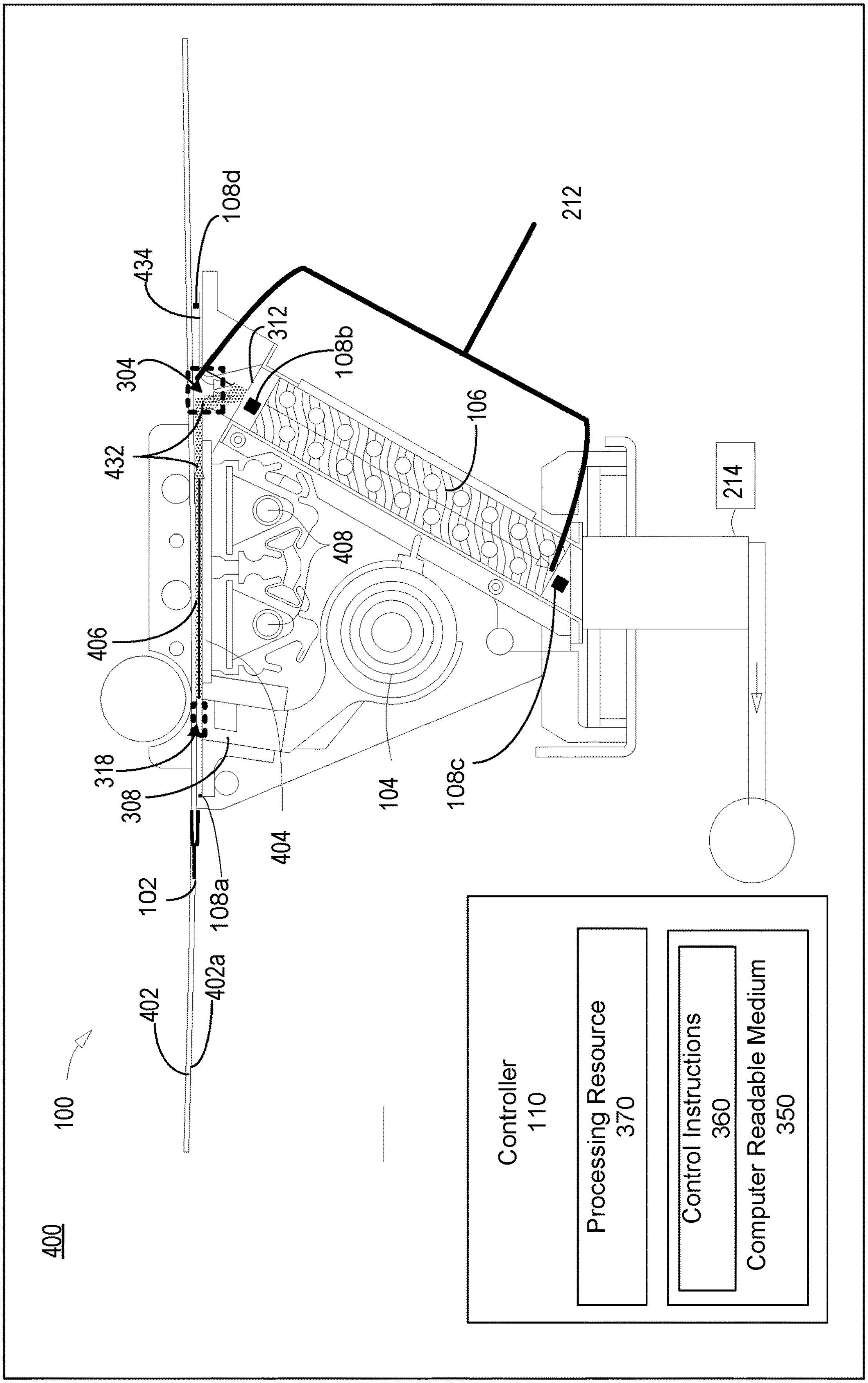
FIG. 4 is a simple schematic diagram that illustrates an example of a system for identification of gas conveyance malfunctions at a printer, wherein a channel for gas conveyance is formed in part by an intermediate transfer member belt face and heat source cover.

FIG. 4 is a simple schematic diagram that illustrates another example of a system for identification of gas conveyance malfunctions 100 included within a printer 400. In this example the system 100 includes an ITM belt 402 situated within the printer 400. In examples, the ITM belt 402 may be an endless belt constructed at least in part from, rubber and/or a silicon-based material. elements. In examples, the ITM belt 402 is movable via a set of rollers, and has a face 402*a* that is heatable and positioned for selective engagement with a photoconductive surface or a set of photoconductive surfaces.

The system 100 includes a cover 404 for a heat source 418 (e.g., a set of heat lamps) positioned opposite a face 402*a* of the ITM belt 402. In examples, the cover 404 be constructed of, or include, one from the set of a metal, a plastic, a glass, and any other heat-tolerant medium.

The system 100 includes a first channel 102 situated to convey a subject gas, with the first channel 102 being formed in part by the face 402 *a* of the ITM belt 402 forming one of the sides of the first channel 102 and by the cover 404 for the heat source 414 at the printer forming another of the sides of the first channel 102. In this example, the subject gas is or includes a potentially volatile vapor that is created when the heat source 418, in combination with the forced hot air provided from an outlet 308 of the hot air knife 104, evaporates carrier fluid residue on present on the face 402 *a* of the ITM belt 402. In an example, the carrier fluid is an isoparaffinic hydrocarbon solvent carrier fluid.

Continuing at FIG. 4, the system 100 includes a second channel 212, a condenser 106, and a negative pressure component 214. The second channel 212 is in fluid connection with the first channel 102 at a junction 304. The condenser 106 is positioned within the second channel 212. The heated air knife 104 has a slit outlet 308 pointed towards the face 402*a* of the ITM belt 402. The outlet is positioned to be in fluid connection with the first channel 102, such that the heated air knife will heat and cause the subject gas to move through the first channel 102 towards the condenser 106. In examples, the outlet 308 is a slit outlet with the slit pointed towards the face 402*a* of the ITM belt 402.

The negative pressure component 214 is operatively connected to the second channel 212 to cause the subject gas to move through the second channel 212 and the condenser situated within the second channel 212. The system 100 includes a set of temperature sensors 108-108*d* situated to take a set of temperature readings of the subject gas within, or adjacent, to the first and second channels 102 212.

In the example of FIG. 4 the system 100 includes a controller 110 operatively connected to each of the set of temperature sensors. 108*a*-108*d*, and to the heat blower 104, the condenser 106, the negative pressure component 214, and the heat source 408. The controller 110 includes a processing resource 370 and a computer readable medium 350 with control instructions 360 that represent programming to control the system 100 for identifying gas conveyance malfunctions.

Continuing at FIG. 4, the processing resource 370 on the controller 110 executing control instructions 360 is to identify a malfunction event for at least one from the set of the air knife, the condenser 106, the first channel 102, and the second channel 212 based upon a comparison of the set of temperature readings to a set of predetermined threshold temperatures.

The processing resource 370 on the controller 110 executing control instructions 360 is to control the heated air knife 104 and the negative pressure component 106 to regulate heating and movement of the subject gas through an evaporation path (designated with a dotted pattern 406 in FIG. 4) of the channel. In an example the evaporation path 406 is a path that begins in the first channel 102 at the second junction 318 (the junction of the heat blower outlet 308 with the first channel 102), extends through the first junction 304 (the junction of the first and second channels 102 212), and ends at an inlet 312 to the condenser 106 included within the second channel 212.

In an example the target gas velocity for the subject gas to travel through the evaporation path 406 is a safety margin velocity at least 3 times the flame propagation velocity for an evaporated isoparaffinic hydrocarbon solvent. As used herein, "flame propagation velocity" is used synonymously with "flame speed" and refers generally to a rate of expansion of a flame front in a combustion reaction. In this manner, a self-sustained fire or flame in the evaporation path 406 is avoided.

Continuing at FIG. 4, in an example a mixing occurs at the junction 304 of the first and second channels 102 212. In an example the mixing is a mixing of heated subject gas 332 that has been heated by the heat blower 104 and received at the junction 304 via first channel 102 from a first direction, and a cooling gas 334 (e.g., air) that is at a temperature (e.g., ambient temperature) less than the temperature of the heated subject gas 332. In an example, the cooling gas 334 is to enter the first channel 102 through an end opening 314 of the first channel 102 that is located on an opposite side of the first junction 304 relative to the location of the outlet 308 of the heat blower 104.

The first temperature sensor 108*a* is positioned adjacent to an end opening 310 of the first channel 102 that is closer to the outlet 308 of the heat blower 104 than to the first junction 304. The processing resource 370 on the controller 110 executing control instructions 360 is to identify a malfunction event for the heat blower 104 or the first channel 102 based upon a comparison of a temperature reading of the subject gas taken by the first temperature sensor 108*a* to a threshold temperature. In an example, controller 110 is to identify the malfunction event based upon a determination the temperature reading is above a threshold temperature between 45 and 55 degrees C. In a particular example, the threshold is 50 degrees C.

A second temperature sensor 108*b* is positioned in the second channel 212 between the first junction 304 and an inlet 312 to the condenser 106.

The processing resource 370 on the controller 110 executing control instructions 360 is to identify a malfunction event for the heat blower 104 or the first channel 102 based upon a comparison of a temperature reading of the subject gas taken by the second temperature sensor 108*b* with a threshold temperature.

In an example, controller 110 is to identify the malfunction event based upon a determination the temperature reading is below a threshold temperature between 90 and 110 degrees C. In a particular example, the threshold is 100 degrees C.

A third temperature sensor 108*c* is situated in the second channel 212 downstream of an outlet 320 of the condenser 106. The processing resource 370 on the controller 110 executing control instructions 360 is to identify a malfunction event for the condenser 106 based upon a comparison of a temperature reading of the subject gas taken by the third temperature sensor 108*c* with a threshold temperature. In an example, controller 110 is to identify the malfunction event based upon a determination the temperature reading exceeds the threshold temperature between 15 and 25 degrees C. In a particular example, the threshold is 20 degrees C.

Continuing at FIG. 4, a fourth temperature sensor 108*d* is positioned adjacent to an end opening 314 of the first channel 102 that is located on an opposite side of the first junction 304 relative to the outlet 308 of the heat blower 104. The processing resource 370 on the controller 110 executing control instructions 360 is to identify a malfunction event for the negative pressure component 214 or the first channel 102 based upon the comparison with a threshold temperature. In an example, controller 110 is to identify the malfunction event based upon a determination the temperature reading exceeds the threshold temperature of between 45 and 55 degrees C. In a particular example, the threshold is 50 degrees C.

After the controller 110 identifies the malfunction event for the heat blower 104, the condenser 106, the first channel 102, and/or the second channel 212, in examples the processing resource 370 on the controller 110 executing control instructions 360 is to initiate a recovery action.

Figure 5:
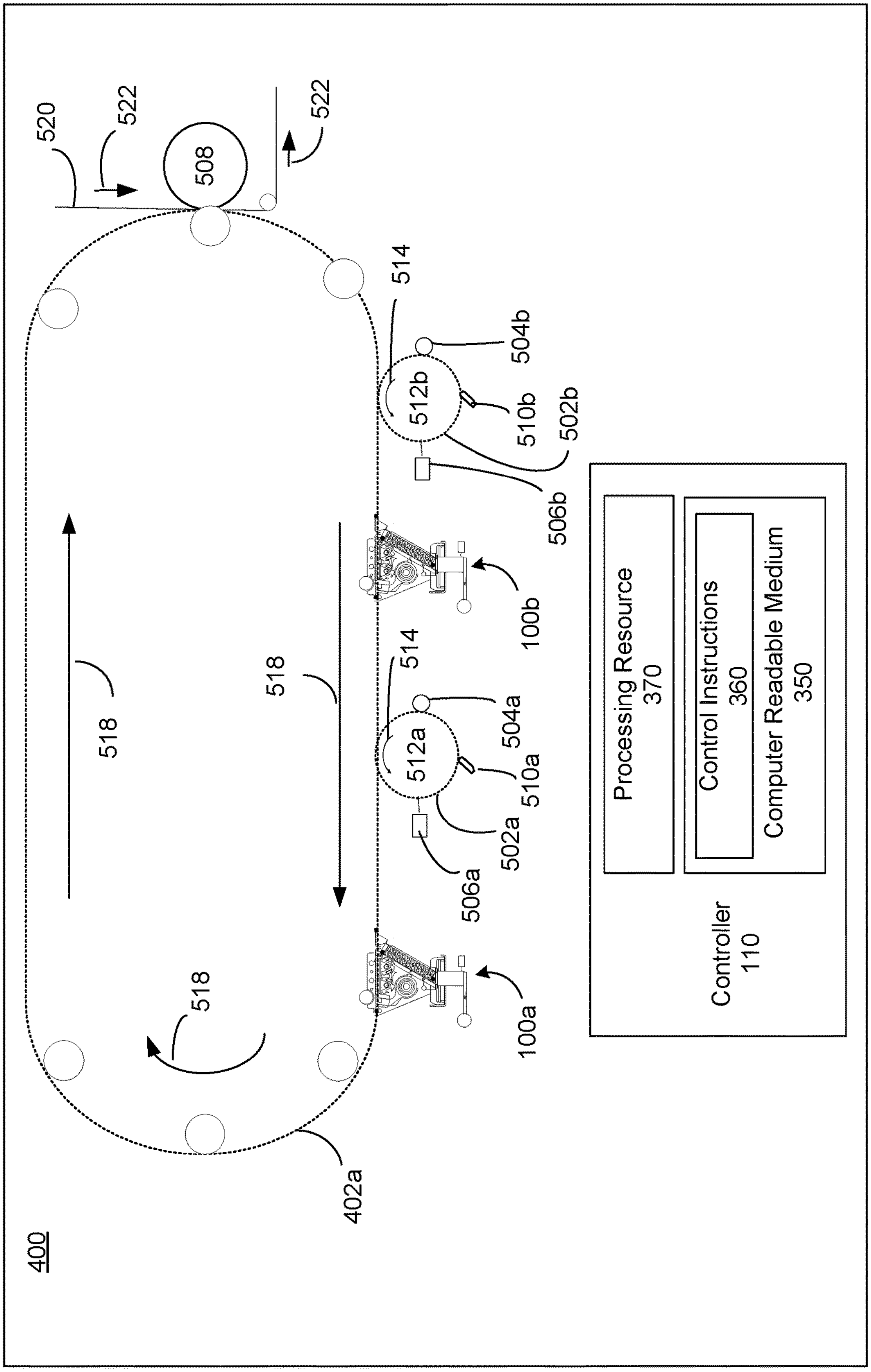
FIG. 5 is a simple schematic diagram illustrating an LEP printer implementing a system for identification of gas conveyance malfunctions, according to an example of the principles described herein.

FIG. 5 is a simple schematic diagram illustrating an LEP printer implementing a system for identification of gas conveyance malfunctions, according to another example of the principles described herein. In this example, each instance of a combination of a developer assembly 510*a* 510*b*, a writing element 506*a* 506*b*, a photoconductive surface 502*a* 502*b*, and a charging element 504*a* 504*b* may be referred to as an "imaging engine." In this example, two inline imaging engines with photoconductive surfaces 502*a* 502*b* are engaged with a single ITM belt 402. Accordingly, this example of an LEP printer 400 is capable of printing up to two separations, e.g., two colors, with a single revolution of the ITM belt 402 at a continuous process speed. In other examples, LEP printer 400 may have more or less inline imaging engines.

According to the example LEP printer of FIG. 5, a pattern of electrostatic charge is formed on each of the photoconductive surfaces 502*a* 502*b* by rotating a clean, bare segment of the photoconductive surface under its respective charging element 504*a* 504*b* and writing element 506*a* 506*b*. The photoconductive surfaces 502*a* 502*b* in this example are cylindrical in shape, e.g., are attached to a first cylindrical drum 512*a* and a second cylindrical drum 512*b* respectively, and rotate in a direction of arrows 514. In other examples, a photoconductive surface may planar or part of a belt-driven system.

The charging elements 504*a* 504*b* may each be or include a charge roller, corona wire, scorotron, or any other charging device. In examples, a uniform static charge is deposited on the photoconductive surface 802 by the charging element 804.

Continuing at FIG. 5, as each of the photoconductive surfaces 502*a* 502*b* continues to rotate, it passes a writing element 506*a* 506*b* where one or more laser or other light source beams dissipate localized charge in selected portions of the respective photoconductive surfaces 502*a* 502*b* to leave an invisible electrostatic charge pattern ("latent image") that corresponds to the image to be printed. In some examples, each of the charging elements 504*a* 504*b* applies a negative charge to the surface of the photoconductive surface 502*a* 502*b*. In other implementations, the charge is a positive charge. Each of the writing elements 502*a* 502*b* then selectively discharges portions of the photoconductive surfaces 502*a* 502*b*, resulting in local neutralized regions on the photoconductive surfaces.

A set of developer assemblies 510*a* 510*b* is disposed adjacent to each the photoconductive surfaces 502*a* 502*b* and may correspond to various LEP ink colors such as cyan, magenta, yellow, black, a custom spot color, and the like. There may be one developer assembly for each ink color. In other examples, e.g., black and white printing, a single developer assembly may be included in LEP printer 400. During printing, the appropriate developer assembly 510*a* 510*b* is engaged with the respective photoconductive surface 502*a* 502*b*. The engaged developer assemblies present a uniform film of LEP ink to the photoconductive surfaces 502*a* 502*b*. The ink contains electrically charged pigment particles which are attracted to the opposing charges on the image areas of the photoconductive surfaces 502*a* 502*b*. As a result, each photoconductive surface 502*a* 502*b* has a developed image on its surface, i.e., a pattern of ink corresponding with the electrostatic charge pattern (also sometimes referred to as a "separation").

Continuing with the example of FIG. 5, during a single revolution of the ITM LEP ink is successively transferred from each of the photoconductive surfaces 502*b* to a face 402*a* of the ITM belt 402. Separations, e.g., color separations, are transferred to the face 402*a* of the ITM belt 402 during the relative rotations of the ITM belt 402 and the photoconductive surfaces 502*a* 502*b*. In the example of FIG. 5, the ITM belt 402 belt rotates in the direction of arrow 518. The transfer of a developed image from each of the photoconductive surfaces 502*a* 502*b* to the face 402*a* of the ITM belt 402 are successive "first transfers", which take place at a point of engagement between each of the photoconductive surfaces 502*a* 502*b* and the face 402*a* of the ITM belt 402.

Once the layers of LEP ink have been transferred to the face 402*a* of the ITM belt 402*a* (via the "first transfer" from each of the photoconductive surfaces 502*a* 502*b*), the layers are next transferred to a print substrate 520. In this example, print substrate 520 is a web substrate moving along a substrate path in a first substrate path direction 522*a*, and then in a second substrate path direction 522*b*. In other examples, the print substrate may a sheet substrate that travels along a substrate path. This transfer from the face 402*a* of the ITM belt 402 to the print substrate 520 may be deemed the "second transfer", which takes place at a point of engagement between the face 402*a* of the ITM belt 402 and the print substrate 520. The impression cylinder 508 can both mechanically compress the print substrate 520 into contact with the face 402*a* of the ITM belt 402 and also help feed the print substrate 520.

Continuing with the example of FIG. 5, controller 110 represents the processing and memory resources and the programming, electronic circuitry and components needed to control the operative elements of LEP printer 400, including the system 100 for identification of gas conveyance malfunctions. In examples, controller 110 may include distinct control elements for individual printer components, including components of the system 100 for identification of gas conveyance malfunctions.

Figure 6:
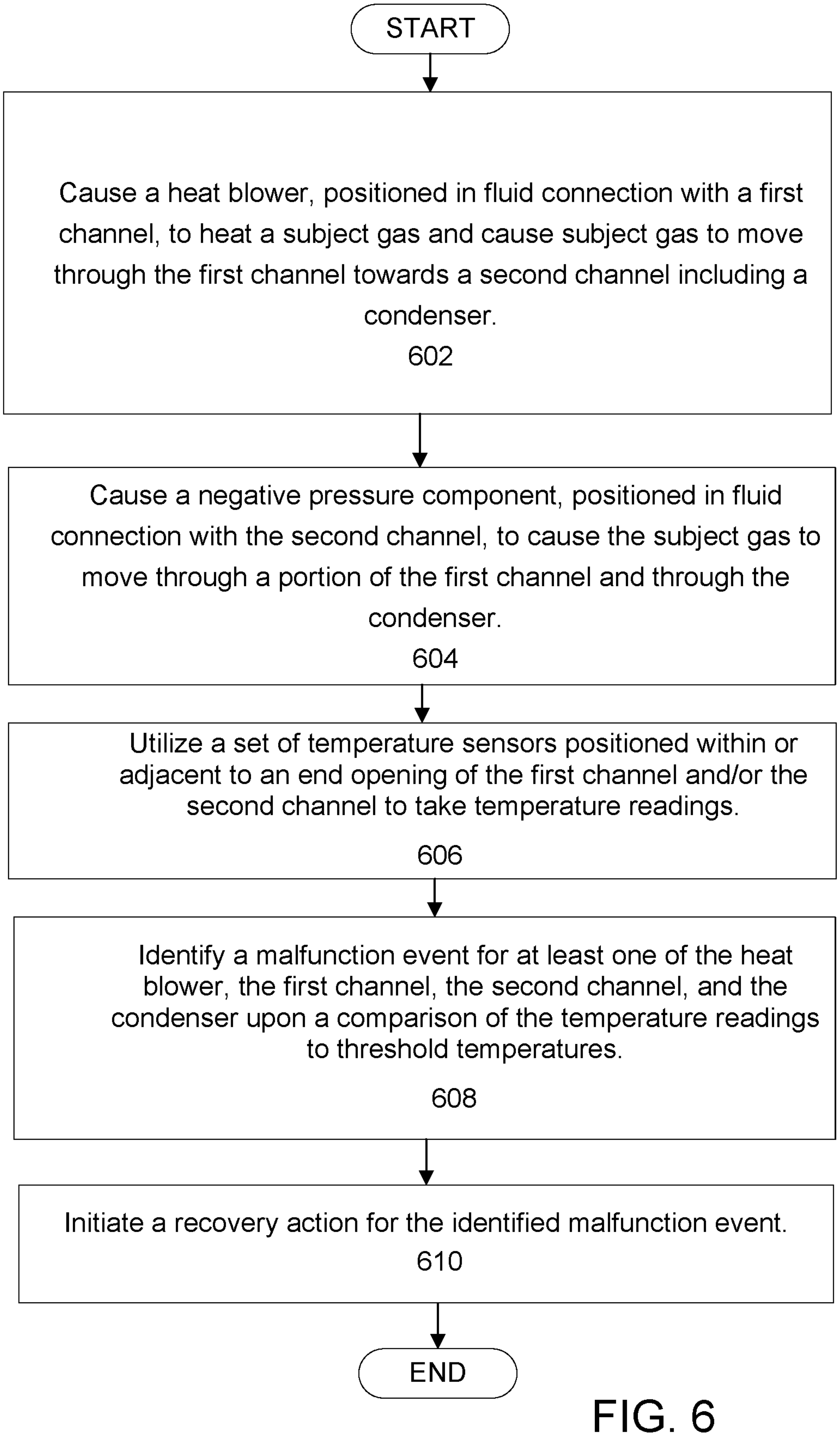
FIG. 6 is a flow diagram depicting an example implementation of a method for identification of gas conveyance malfunctions.

FIG. 6 is a flow diagram of implementation of a method for identification of gas conveyance malfunctions. In discussing FIG. 6, reference may be made to the components depicted in FIGS. 3-5. Such reference is made to provide contextual examples and not to limit the manner in which the method depicted by FIG. 6 may be implemented. A heat blower, positioned in fluid connection with a first channel, is caused to heat the subject gas and cause the subject gas to move through the first channel towards a second channel that includes the condenser (block 602). Referring back to FIGS. 3-5, control instructions 360, when executed by processing resource 370, may be responsible for implementing block 602.

A negative pressure component, positioned in fluid connection with the second channel, is to cause the subject gas to move through a portion of the first channel and through the condenser (block 604). Referring back to FIGS. 3-5, control instructions 360, when executed by processing resource 370, may be responsible for implementing block 604.

A set of temperature sensors positioned within, or adjacent to an end opening of, the first channel and/or the second channel are utilized to take temperature readings (block 606). Referring back to FIGS. 3-5, control instructions 360, when executed by processing resource 370, may be responsible for implementing block 606.

A malfunction event for at least one from the set of the heat blower, the first channel, the second channel, the condenser, and the negative pressure component is identified based upon a comparison of the set of temperature readings to a set of threshold temperatures (block 608). Referring back to FIGS. 3-5, control instructions 360, when executed by processing resource 370, may be responsible for implementing block 608.

A recovery action for the identified malfunction event is initiated (block 610). Referring back to FIGS. 3-5, control instructions 360, when executed by processing resource 370, may be responsible for implementing block 610.

Figure 7:
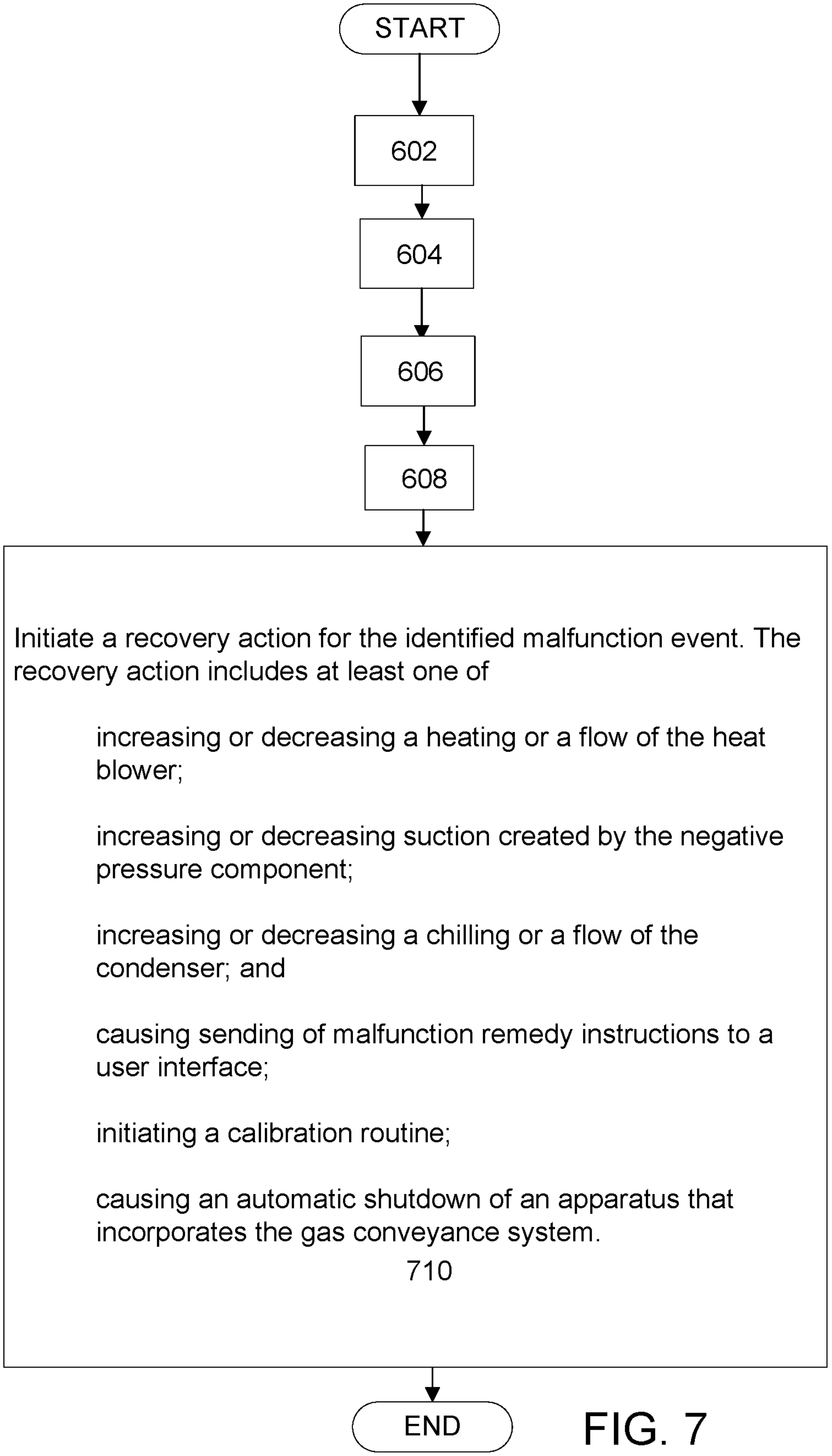
FIG. 7 is a flow diagram depicting an example implementation of a method for identification of gas conveyance malfunctions, the method including initiating a recovery action for an identified malfunction event.

FIG. 7 is a flow diagram depicting another example implementation of a method for identification of gas conveyance malfunctions. In discussing FIG. 7, reference may be made to the components depicted in FIGS. 3-5. Such reference is made to provide contextual examples and not to limit the manner in which the method depicted by FIG. 7 may be implemented.

The example of FIG. 7 is substantially similar to the example of FIG. 6. Specifically, the example of FIG. 7 includes each of blocks 602, 604, 606, and 608 of FIG. 6, and an additional block 710 described below.

A recovery action for the identified malfunction event is initiated. The recovery action includes at least one from the set of: increasing or decreasing a heating or a flow of the heat blower; increasing or decreasing suction created by the negative pressure component; increasing or decreasing a chilling or a flow of the condenser; causing sending of malfunction remedy instructions to a user interface; initiating a calibration routine; and causing an automatic shutdown of an apparatus that incorporates the first and second channels (block 710). Referring back to FIGS. 3-5, control instructions 360, when executed by processing resource 370, may be responsible for implementing block 710.

FIGS. 1-7 aid in depicting the architecture, functionality, and operation of various examples. In particular, FIGS. 1-5 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A "processing resource" is an instruction execution system such as a computer/processor-based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 6 and 7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A system for identification of gas conveyance malfunctions, comprising:

a channel situated to convey a subject gas, wherein the channel is formed in part by a face of an intermediate transfer member ("ITM") belt situated within a printer forming one of the sides of the channel and by a cover for a heat source at the printer forming another of the sides of the channel;

a condenser, in fluid connection with the channel;

a heat blower positioned in fluid connection with the channel, to heat the subject gas, and to cause the subject gas to move through the channel towards the condenser;

a temperature sensor situated to take a temperature reading of the subject gas within or adjacent the channel; and a controller operatively connected to the temperature sensor, the controller to identify a malfunction event for the heat blower, the condenser, or the channel based upon a comparison of the temperature reading to a threshold temperature.

2. The system of claim 1, wherein the controller is to initiate a recovery action for the identified malfunction event, the recovery action including at least one from the set of increasing or decreasing a heating or a flow of the heat blower;

increasing or decreasing suction;

increasing or decreasing a chilling or a flow of the condenser; and causing sending of malfunction remedy instructions to a user interface; initiating a calibration routine; and causing an automatic shutdown of an apparatus that incorporates the channel.

3. The system of claim 1, wherein the channel is a first channel;

the system comprising a second channel fluidly connected to the first channel at a junction;

wherein the condenser is situated within the second channel.

4. The system of claim 3, wherein the junction is a first junction;

wherein the heat blower includes an outlet extended to form a second junction with the first channel;

wherein the temperature sensor is positioned adjacent to an end opening of the first channel that is closer to the outlet of the heat blower than to the first junction; and wherein the controller is to identify a malfunction event for the heat blower or the first channel based upon the comparison.

5. The system of claim 4, wherein the controller is to identify a malfunction event if the temperature reading is above a threshold temperature between 45 and 55 degrees C.

6. The system of claim 3, wherein the temperature sensor is situated in the second channel between the junction and an inlet to the condenser; and wherein the controller is to identify a malfunction event for the heat blower, the condenser, the first channel, or the second channel based upon the comparison.

7. The system for identification of gas conveyance malfunctions of claim 6, wherein the controller is to identify a malfunction event if the temperature reading is below a threshold temperature between 90 and 110 degrees C.

8. The system of claim 3, wherein the temperature sensor is situated in the second channel downstream of an outlet of the condenser; and wherein the controller is to identify a malfunction event for the condenser.

9. The system of claim 8, wherein the controller is to identify a malfunction event if the temperature reading is above a threshold temperature between 15 and 25 degrees C.

10. The system of claim 3, wherein the temperature sensor is positioned adjacent to an end opening of the first channel that is located on an opposite side of the junction relative to an outlet of the heat blower; and wherein the controller is to identify a malfunction event for the channel based upon the comparison.

11. The system of claim 10, wherein the controller is to identify a malfunction event if the temperature reading is above a threshold temperature between 45 and 55 degrees C.

12. The system of claim 1, wherein the heat blower is a heated air knife and has an outlet pointed toward the face of the ITM belt; and wherein the controller is to control the heated air knife to regulate heating and movement of the subject gas through an evaporation path of the channel.

13. A method for identification of gas conveyance malfunctions, comprising:

causing a heat blower, positioned in fluid connection with a first channel, to heat the subject gas and cause the subject gas to move through the first channel towards a second channel including a condenser, wherein the channel is formed in part by a face of an intermediate transfer member ("ITM") belt situated within a printer forming one of the sides of the channel and by a cover for a heat source at the printer forming another of the sides of the channel;

causing a negative pressure, in fluid connection with the second channel, to cause the subject gas to move through a portion of the first channel and through the condenser;

utilizing a set of temperature sensors positioned within, or adjacent to an end opening of, the first channel and/or the second channel to take temperature readings;

identifying a malfunction event for at least one from the set of the heat blower, the first channel, the second channel, and the condenser based upon a comparison of the temperature readings to threshold temperatures; and initiating a recovery action for the identified malfunction event.

14. The method of claim 13, wherein the recovery action includes at least one from the set of increasing or decreasing a heating or a flow of the heat blower;

increasing or decreasing suction;

increasing or decreasing a chilling or a flow of the condenser;

causing sending of malfunction remedy instructions to a user interface;

initiating a calibration routine; and causing an automatic shutdown of an apparatus that incorporates the first and second channels.

15. A system for conveyance of a subject gas at a printer, comprising:

an intermediate transfer member ("ITM") belt situated within a printer;

a cover for a heat source positioned opposite a face of the belt;

a first channel situated to convey a subject gas, the first channel being formed in part by a face of the ITM belt and the cover;

a second channel fluidly connected to the first channel at a junction; a condenser positioned within the second channel;

a heated air knife, with an outlet in fluid connection with the first channel, positioned to heat a subject gas, and to cause the subject gas to move through the first channel towards the condenser;

a set of temperature sensors situated to take a set of temperature readings within, or adjacent, to the first and second channels; and a controller operatively connected to the each of the set of temperature sensors, the controller to identify a malfunction event for at least one from the set of the air knife, the condenser, the first channel, and the second channel based upon a comparison of the set of temperature readings to a set of predetermined threshold temperatures.

* * * * *